Nov. 3, 1959

E. L. DOPIERALSKI 2,911,483

MAGNETIC RECORDING HEAD STRUCTURE

Filed March 5, 1957

Inventor
Edmund L. Dopieralski
by Francis E. Blake
Attorney

United States Patent Office 2,911,483
Patented Nov. 3, 1959

2,911,483

MAGNETIC RECORDING HEAD STRUCTURE

Edmund L. Dopieralski, Rochester, N.Y., assignor to General Dynamics Corporation, Rochester, N.Y., a corporation of Delaware

Application March 5, 1957, Serial No. 644,002

4 Claims. (Cl. 179—100.2)

This invention relates to magnetic transducer constructions and, more particularly, to new and improved means for mounting and supporting magnetic transducers.

In the co-pending application of Charles R. Fisher and Frank A. Morris, Serial No. 634,973, filed January 18, 1957, which application is assigned to the same assignee as the present application, there is shown a data recording and reproducing link using an endless length of magnetic film or tape to provide intermediate storage of data. Incoming data in permutation code form is recorded on five spaced parallel channels on the tape by a recording assembly of five magnetic transducing heads spaced transversely of the tape with their gaps in substantial alignment. The data bearing tape or film is advanced following recording into a storage loop from which it is fed by suitable step-by-step advancing means when the data is to be transmitted. Since the data is recorded in spaced transversely aligned signal groups, each separate signal group is individually moved past the gaps of a group of transducing heads in a transmitter by the step-by-step feeding means in order to provide output voltages representing the recorded signals. Accordingly, the gaps of the reproducing heads must also be transversely aligned in the manner of the recording heads and must also be spaced approximately midway between the successive code groups on the tape in order to insure that the recorded signals move past the reproducing heads at a sufficient speed to induce an adequate output voltage.

Accordingly, one object of the present invention is to provide a new and improved transducer head assembly.

Another object is to provide an adjustable support for a transducer head.

Another object is to provide a transducer head construction including new and improved means for detachably mounting the head on a support.

Another object is to provide a transducer assembly including an adjustable support for a plurality of aligned heads which are detachably mounted on the support.

In accordance with these and many other objects, an embodiment of the present invention comprises a plurality of individual magnetic transducers which are secured within a transducer housing with their gaps in substantial transverse alignment. In order to detachably mount the aligned heads on a base structure, a supporting bracket is provided having a pair of spaced arms formed with projecting portions or tongues. The side walls of the transducer housing are provided with cooperating grooves in which are slidingly received the tongues formed on the arms of the supporting bracket. In order to prevent the inadvertent removal of the transducer housing from the supporting bracket, the projecting portion or tongue on one of the arms of the supporting bracket is recessed to define a slot within which is disposed an arcuately formed flat spring which bears against one of the walls of the transducer housing. To permit the aligned gaps of the heads to be properly disposed relative to the recorded information on a magnetic medium, the supporting bracket is mounted on the base structure for pivotable movement about an axis extending substantially parallel to the aligned gaps. A bracket secured to the base structure supports a compression spring which engages one side of the supporting bracket, and the other side of the supporting bracket is engaged by a lead or adjusting screw carried on another separate bracket, which is secured to the base structure at the other side of the supporting bracket. Accordingly, when the adjusting screw is advanced in either direction the support is pivoted about an axis parallel to the aligned gaps to move these gaps into a proper relationship with the spaced signal groups recorded on the magnetic tape.

Other objects and advantages of the present invention will become apparent from the following description of an illustrative embodiment thereof, in the course of which reference is made to the accompanying drawings in which.

Figure 1:
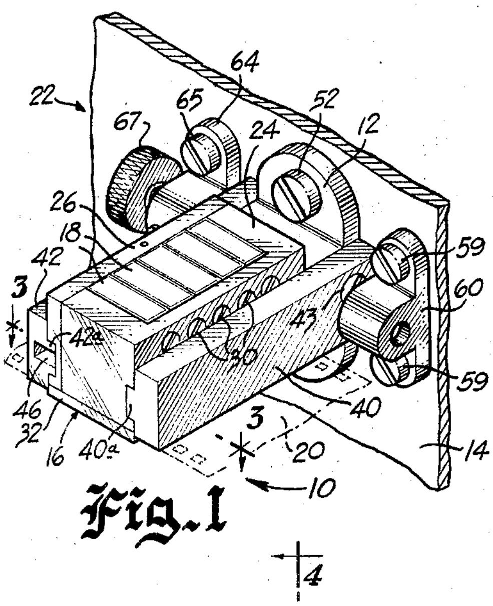
Figure 1 is a perspective view, taken from above and to the right, illustrating the improved transducer assembly of the present invention.
Figure 2:
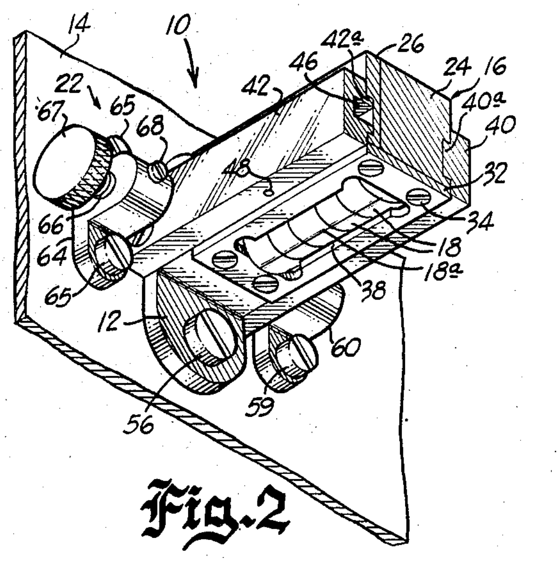
Figure 2 is a perspective view, considered from below and to the left, of the assembly shown in Figure 1.

Referring now to Figures 1 and 2 of the drawing, therein is shown a magnetic transducer assembly indicated generally as 10, embodying the present invention. The transducer assembly comprises a supporting bracket 12 which is pivotally mounted on a base structure 14 of a recorder or reproducer. A transducer housing 16 containing a plurality of individual and identical transducing heads 18 having their gaps 18*a* in transverse alignment is detachably mounted on the supporting bracket 12. An intermediate portion of a length of magnetic film or tape 20, shown in the dotted outline, is urged into engagement with the gap-defining portions of the transducing heads 18 by a suitable pressure pad assembly (not shown) so that, when the magnetic film 20 is advanced step-by-step, successive permutation code signal groups are moved or swept past the aligned pads 18*a*. To provide a means for suitably locating the gaps 18*a* of the transducing heads 18 relative to the signal groups recorded on the magnetic medium 20, an adjusting means, indicated generally as 22, is provided, which pivotly displaces the supporting bracket 12 about an axis substantially parallel to the aligned gaps 18*a*.

Figure 4:
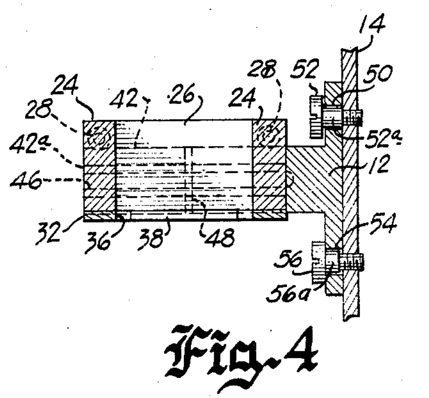
Figure 4 is a cross-section view taken along line 4—4 in Figure 3, assuming that the complete structure is shown therein.

Referring now more specifically to the housing 16 in which the individual transducer heads 18 are mounted, the housing 16 comprises a substantially U-shaped housing element 24 to the legs of which a plate 26 is secured by a plurality of screws 28 (Fig. 4). The housing elements 24 and 26, as well as the machine screws 28, are formed of a nonmagnetic material, such as brass. Each of the individual transducing heads 18 preferably comprises a magnetic core structure defining the gap 18*a* and an energizing winding wound on a bobbin which is mounted on the magnetic core structure. These components are cast in a suitable plastic material to provide substantially rectangular units having slightly rounded end portions including the gaps 18*a*, as illustrated in Figure 2 of the drawings. The individual transducer heads 18 are mounted in a side-by-side relationship within the housing 16 in a position with the gaps 18*a* in substantial alignment. The housing element 24 is provided with a plurality of threaded apertures 29 (Figure 5) for receivng a plurality of set screws 30 (Figure 1) which secure the individual heads 18 in their assembled relationship within the housing 16. To complete the assembly of the housing 16, a cover plate 32 is provided, which is secured to the lower edges of the housing elements 24 and 26 by suitable fastening means 34. The plate 32 defines a substantially rectangular opening 36 through which the rounded ends of the individual transducer heads 18 extend and is further provided with a pair of inwardly extending lips 38 which engage the plastic bodies of the transducing heads 18 to prevent inadvertent displacement.

Figure 3:
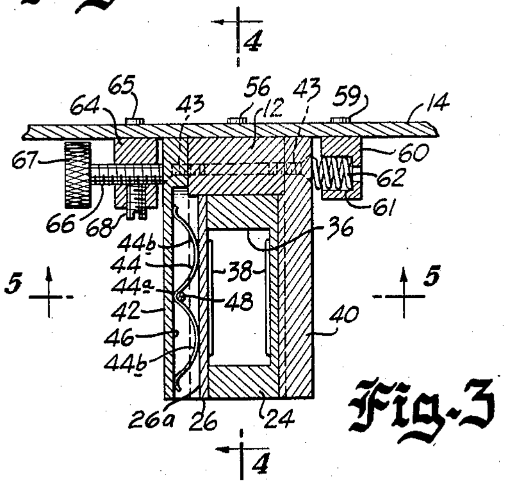
Figure 3 is a cross-section view taken along line 3—3 in Figure 1, with the individual transducing heads removed.

To provide a means for detachably mounting the transducer housing 16 on the base member 14, the supporting member 12 is provided with a pair of spaced parallel and outwardly extending arms 40 and 42, which are secured to the body of the supporting bracket 12 by suitable fastening means 43 (Figures 1 and 3). The projecting arms 40 and 42 are provided with integrally formed and longitudinally extending projecting portions or tongues **40*a* and 42*a*, which are adapted to be slidably received within correspondingly formed grooves 24*a* and 26*a* in the side walls of the housing 16. Accordingly, when the housing 16 is to be assembled on the supporting bracket 12, the tongues 40*a* and 42*a* are moved into alignment with the slots or grooves 24*a* and 26*a*, respectively, and the housing 16 is displaced inwardly toward the bracket 12, thereby detachably mounting the transducer housing 16 on the base 14**.

In order to provide means for preventing inadvertent displacement or removal of the housing 16 from the supporting bracket 12, a detent means is provided. This detent means includes an arcuately formed flat spring 44 which is disposed within a recess or slot 46 formed in the projecting portion **42*a* on the supporting arm 42. An intermediate bight portion 44*a* of the spring 44 is held in engagement with the inner or bottom wall of the slot 46 by a pin 48 carried on the arm of 42. Two intermediate rounded portions 44*b* of the spring 44 project slightly above the upper end of the slot 46 so that, when the housing 16 is assembled on the supporting bracket 12, the rounded portions 44*b* engage the lower wall of the groove 26*a* thereby to resiliently bias the housing 16 into intimate engagement with the supporting arms 40 and 42. Since the ends of the spring 44 are not secured to the arm 42, they are free to move along the bottom wall of the slot 46 when the spring 44 is compressed due to engagement with the housing 16**.

To mount the supporting bracket 12 on the base plate 14 for limited pivotal movement, the upper end of the bracket 12 is provided with an aperture 50 through which extends a machine screw 52 secured to the base 14. The screw 52 includes a cylindrical portion **52*a* serving as a shaft for pivotally supporting the bracket structure 12. The bracket 12 is also provided with an arcuate slot 54 (Figures 4 and 5) through which extends a machine screw 56 secured to the base plate 14. The screw 56 includes a cylindrical portion 56*a* which is of a shorter axial length than the portion 52*a* on the pivot defining screw 52. Therefore, the screw 56 can be tightened after the support 12 is adjusted to a selected position to clamp the support 12 against the base 14**.

Figure 5:
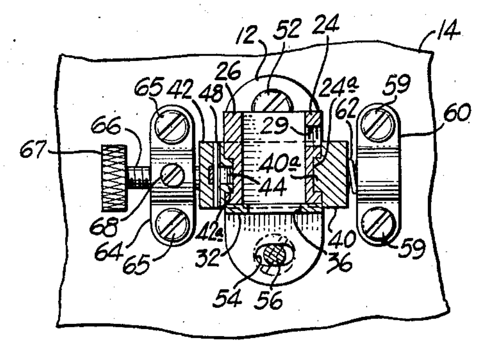
Figure 5 is a cross-sectional view taken along line 5—5 in Figure 3, again assuming that the entire supporting and mounting structure is shown therein.

As illustrated in Figure 5, the arcuate slot 54 permits only limited pivotal movement of the supporting bracket 12 about the axis provided by the machine screw 52. It should be noted that the axis of support for the bracket 12 is substantially parallel to the aligned gaps **18*a* so that, when the bracket 12 is pivotally displaced, the aligned gaps 18*a* are moved forwardly or rearwardly relative to the direction of movement of the magnetic tape 20 to permit the gaps 18*a*** to be moved to a position midway between successive groups of recorded permutation code signals.

As set forth above, the adjusting means 22 provide means for moving the adjustable support structure 12 and, accordingly, the aligned gaps **18*a* of the transducer heads 18 to a selected pivotal position. The adjusting means 22 includes a bracket 60 which is secured to the base plate 14 by a pair of fasteners 59 and which is provided with a cylindrical recess 61. One end of a compression spring 62 is mounted in the recess 61 and the other end of this spring bears against the supporting arm 40, thereby to continually bias the supporting bracket 12 in a clockwise direction about the axis of the machine screw 52, as viewed in Figures 1 and 5 of the drawings. The adjusting means 22 also includes a second bracket 64 secured to the base plate 14 by a pair of screws 65. The bracket 64 is provided with an internally threaded aperture for receiving a lead screw 66 having a knurled knob 67 formed on one end thereof. The other end of the lead screw 66 bears against an outer surface of the supporting arm 42, so that, by suitably adjusting the lead screw 66, the supporting bracket 12 is adjusted to a predetermined pivotal position relative to the magnetic tape 20 and the supporting base 14. The lead screw 66 is secured in a selected position by tightening a set screw 68 which bears against the lead screw 66** at its inner end.

When the transducing assembly 10 is assembled, a plurality of individual transducer heads 18 are positioned within the housing 16 with their gaps **18*a* disposed in substantial alignment, and the plurality of set screws 30 are tightened to hold the individual transducing heads 18 in their proper assembled relationship. The housing 16 is then disposed adjacent the arms 40 and 42 of the supporting structure with the grooves 24*a* and 26*a* in the housing 16 aligned with the projecting portions or tongues 40*a* and 42*a* formed on the supporting arms. Thereafter, the housing 16 is moved inwardly toward the supporting bracket 12 until the inner wall of the housing 16 engages the supporting bracket 12. During this inward movement the rounded portions 44*b* of the flat spring 44 engage the bottom wall of the groove 26*a* to resiliently bias the housing 16 into engagement with the supporting arms 40 and 42 and thereby prevent inadvertent removal of the housing 16**.

Following the completion of the assembly of the transducer housing 16 on the supporting bracket 12, suitable tests are made to determine the position of the aligned gaps **18*a* relative to the plurality of signal groups recorded on the magnetic tape 20. In the event that these gaps 18*a* are improperly positioned relative to the recorded information, the set screw 68 and the locking screw 56 are loosened and the lead screw 66 is rotated in a clockwise or counter-clockwise direction so that the combined forces provided by both the adjustment of the lead screw 66 and the compression spring 62 pivot the supporting bracket 12 about the axis afforded by the machine screw 52 to a position in which the gaps 18*a* are disposed approximately midway between successive signal groups. Thereafter, the set screw 68 is again tightened to prevent a change in the position of the lead screw 66. The locking screw 56 is also tightened to positively secure the supporting bracket 12 in this selected position relative to the base plate 14 and the magnetic medium 20. It should be noted that the degree of pivotable movement which can be obtained by the adjusting means 22 is limited by engagement of the machine screw 56 with the ends of the arcuate slot 54. However, the length of the slot 54 can be suitably cut to provide an adequate range of variation, when considered in conjunction with the spacing between successive aligned signal groups on the magnetic tape 20**.

In summary, therefore, the transducer assembly 10 of the present invention provides new and improved means for detachably mounting a plurality of individual transducer heads 18 on the supporting structure 12, thereby permitting the transducer heads to be readily removed from the supporting structure 12 to facilitate their replacement or visual examination. Further, in order to insure the adequate alignment of the gaps **18*a* of the transducing heads relative to recorded signal groups on the magnetic medium 20, the supporting bracket 12 is capable of adjustment about an axis substantially parallel to the aligned gaps 18a under the control of the adjusting means 22**.

While the present invention has been described in conjunction with a specific embodiment thereof, it is obvious that many other modifications and embodiments may be devised by those skilled in the art which will fall within the spirit and scope of the principles of this invention.

What is claimed as new and desired to be secured by Letters Patent of the United States is:

1. In combination with a transducer head having a gap relative to which a magnetic medium is moved, a base structure, transducer head supporting means mounted on said base structure for pivotal movement about an axis spaced from and parallel to said gap, said axis and said gap being located substantially within a single plane, resilient means carried on said base structure and engaging said supporting means at one side of said axis, and adjusting means carried on said base and engaging said supporting means at the other side of said axis opposite said resilient means, said resilient means and said adjusting means acting on said supporting means in opposite directions substantially perpendicular to said plane so that said resilient means urges; said supporting means toward said adjusting means whereby movement of said adjusting means varies the location of said gap relative to said medium.

2. The combination set forth in claim 1 in which said adjusting means comprises a first bracket secured to said base structure, and a threaded member carried by said bracket and engaging said supporting means; and in which said resilient means comprises a second bracket mounted on said base structure directly opposite said first bracket, and a compression spring carried on said second bracket and engaging said supporting means in alignment with said threaded member.

3. A transducer assembly comprising a transducer housing, a plurality of transducer heads mounted in said housing, each of said heads having a gap and said heads being mounted in said housing with said gaps lying along a single line, a supporting bracket having a pair of spaced arms, means including interfitting tongues and grooves formed on said housing and said arms along lines parallel to said single line for detachably mounting said housing on said bracket, means for mounting said bracket for pivotal movement about an axis parallel to said single line, and adjustable means for holding said supporting bracket in different spaced pivoted positions.

4. The transducer assembly set forth in claim 3 including resilient means interposed between said housing and at least one of said arms for detachably securing said housing on said arms.

References Cited in the file of this patent

UNITED STATES PATENTS

| | | |
|---|---|---|
| 478,014 | Nevel | June 28, 1892 |
| 603,583 | Warren | May 3, 1898 |
| 925,524 | Steinmetz | June 22, 1909 |
| 1,094,397 | Abbath | Apr. 21, 1914 |
| 2,360,625 | Walker | Oct. 17, 1944 |
| 2,668,879 | D'Arcy | Feb. 9, 1954 |
| 2,721,743 | Erickson | Oct. 25, 1955 |
| 2,756,280 | Rettinger | July 24, 1956 |

FOREIGN PATENTS

| | | |
|---|---|---|
| 676,810 | Germany | June 12, 1959 |
| 524,589 | Belgium | Dec. 15, 1953 |